United States Patent
Audouard et al.

(10) Patent No.: US 10,261,267 B2
(45) Date of Patent: Apr. 16, 2019

(54) MODULE OF A PRINTER WITH A CONFIGURABLE CONNECTOR

(71) Applicant: Dover Europe Sàrl, Vernier (CH)

(72) Inventors: Vincent Audouard, Toulaud (FR); Jean-François Desse, Guilherand Granges (FR)

(73) Assignee: DOVER EUROPE SÀRL, Vernier (CH)

( * ) Notice: Subject to any disclaimer, the term of this patent is extended or adjusted under 35 U.S.C. 154(b) by 0 days.

(21) Appl. No.: 15/793,089

(22) Filed: Oct. 25, 2017

(65) Prior Publication Data

US 2018/0045901 A1 Feb. 15, 2018

Related U.S. Application Data

(63) Continuation of application No. 15/088,178, filed on Apr. 1, 2016, now Pat. No. 9,835,810.

(30) Foreign Application Priority Data

Apr. 2, 2015 (FR) ...................................... 15 52873

(51) Int. Cl.
*G02B 6/38* (2006.01)
*B41J 2/175* (2006.01)
(Continued)

(52) U.S. Cl.
CPC ............ *G02B 6/3887* (2013.01); *B41J 2/175* (2013.01); *B41J 2/17526* (2013.01); *B41J 29/02* (2013.01); *F16L 33/227* (2013.01); *H01R 4/58* (2013.01)

(58) Field of Classification Search
CPC .................................................. F16L 33/227
See application file for complete search history.

(56) References Cited

U.S. PATENT DOCUMENTS

| 4,415,070 A | 11/1983 | Pickering et al. |
|---|---|---|
| 5,417,614 A | 5/1995 | Dykema et al. |

(Continued)

FOREIGN PATENT DOCUMENTS

| CN | 101714717 A | 5/2010 |
|---|---|---|
| CN | 101814670 A | 8/2010 |

(Continued)

OTHER PUBLICATIONS

Search Report issued in French Patent Application No. 15 52873 dated Feb. 3, 2016.

(Continued)

*Primary Examiner* — Omar R Rojas
(74) *Attorney, Agent, or Firm* — Pearne & Gordon LLP

(57) ABSTRACT

A terminal for making a hydraulic, electrical, or optical connection in an ink jet printing machine. The terminal extends along an axis XX', and its external surface includes: a cylindrical portion, including a contact end and having a first diameter (d1), this end being provided with hydraulic or electrical or optical connection structure. The external surface also includes a collar, having a diameter (d2) higher than the first diameter (d1), and a throat, the bottom of which has a cross-section, in a plane perpendicular to the axis XX', having at least one arc of circle portion having a third diameter (d3) lower than that of the collar, at least one planar part, and a part of this cross-section having a width lower than the third diameter. The throat continues with a connection device, for connecting to at least one hydraulic conduit or one electrical cable or one optical fiber.

13 Claims, 11 Drawing Sheets

(51) Int. Cl.
  *H01R 4/58* (2006.01)
  *B41J 29/02* (2006.01)
  *F16L 33/22* (2006.01)

(56) References Cited

U.S. PATENT DOCUMENTS

| | | |
|---|---|---|
| 6,264,318 B1 | 7/2001 | Oda |
| 6,305,849 B1 | 10/2001 | Roehrs |
| 7,008,051 B2 * | 3/2006 | Akermalm ........... B41J 2/17509 347/85 |
| 9,038,259 B2 * | 5/2015 | Wells ..................... F16L 25/01 29/450 |
| 9,067,424 B1 | 6/2015 | Tominaga |
| 2002/0097964 A1 | 7/2002 | Roehrs |
| 2004/0045447 A1 | 3/2004 | Navarro |
| 2005/0110836 A1 | 5/2005 | Colombat |
| 2009/0096836 A1 | 4/2009 | Haines |
| 2014/0253643 A1 | 9/2014 | Yoda |
| 2016/0039216 A1 | 2/2016 | Ribiero |
| 2016/0075897 A1 | 3/2016 | Barbet |

FOREIGN PATENT DOCUMENTS

| | | |
|---|---|---|
| EP | 0 778 142 A1 | 6/1997 |
| EP | 2 332 728 A1 | 6/2011 |
| FR | 3 003 798 A1 | 10/2014 |
| JP | 5 513695 B1 | 6/2014 |
| TW | 200924990 A | 6/2009 |
| WO | 03/080346 A1 | 10/2003 |
| WO | 2009/047510 A1 | 4/2009 |
| WO | 2012/066354 A1 | 5/2012 |
| WO | 2014/154830 A1 | 10/2014 |

OTHER PUBLICATIONS

Partial European Search Report and Provisional Written Opinion issued in European Patent Application No. 16163314 dated May 17, 2017.
Chinese Office Action for Application No. 201610204475.1, dated Jan. 22, 2019.

* cited by examiner

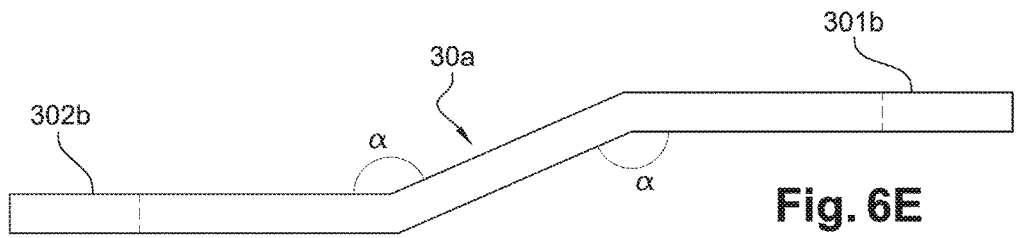
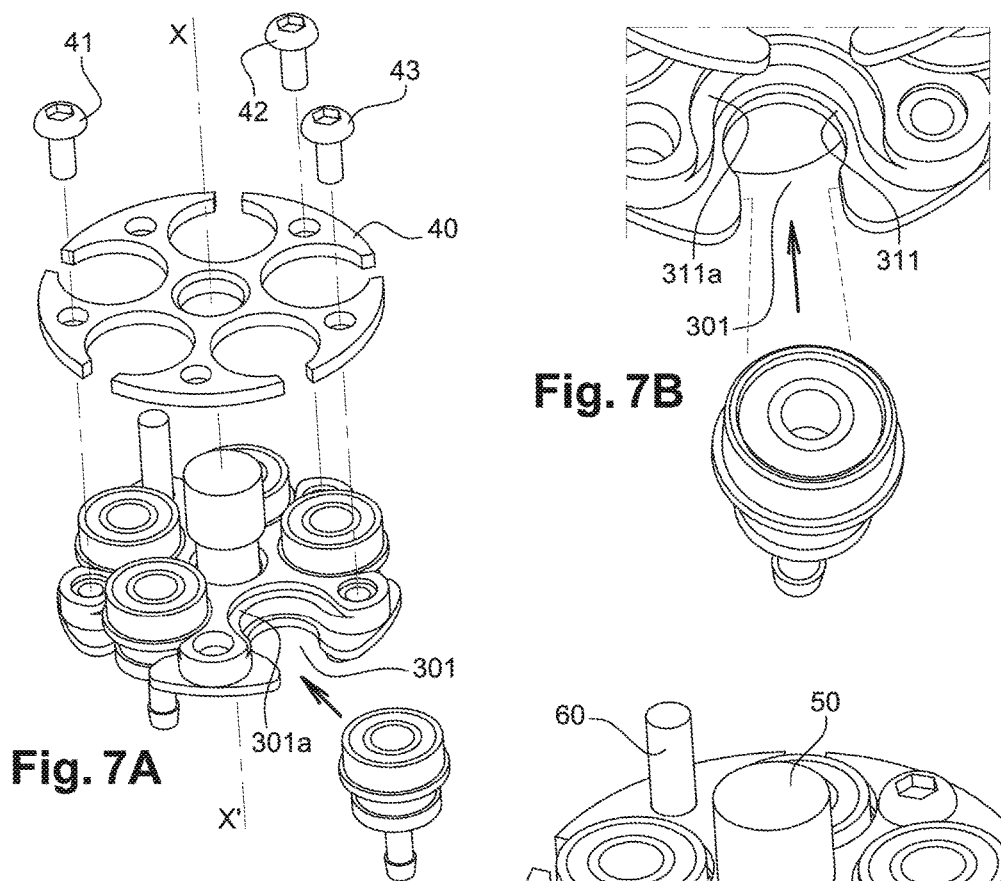

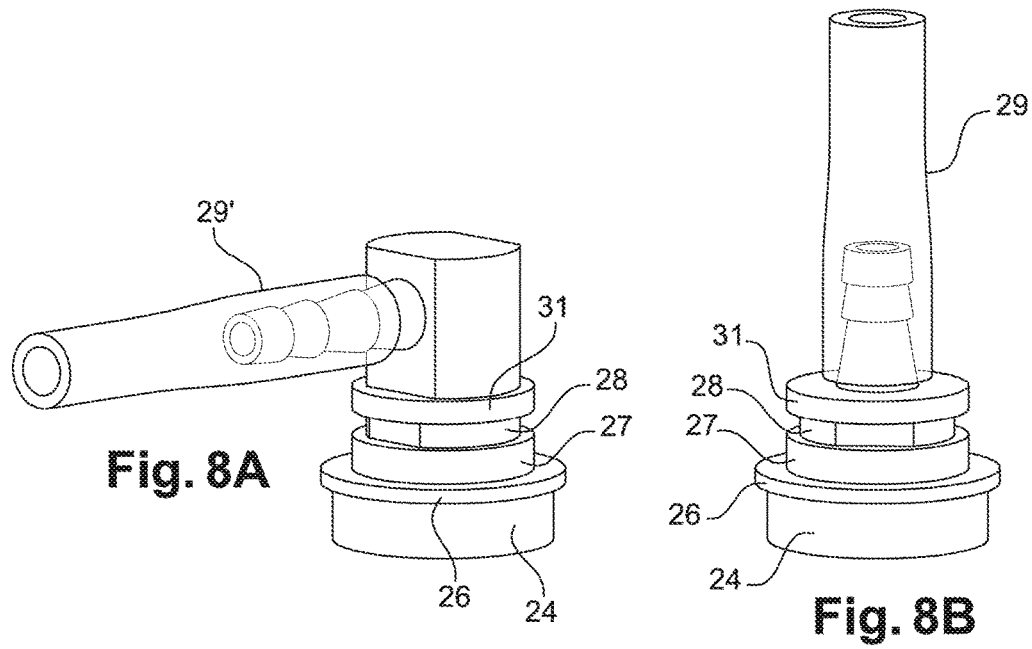
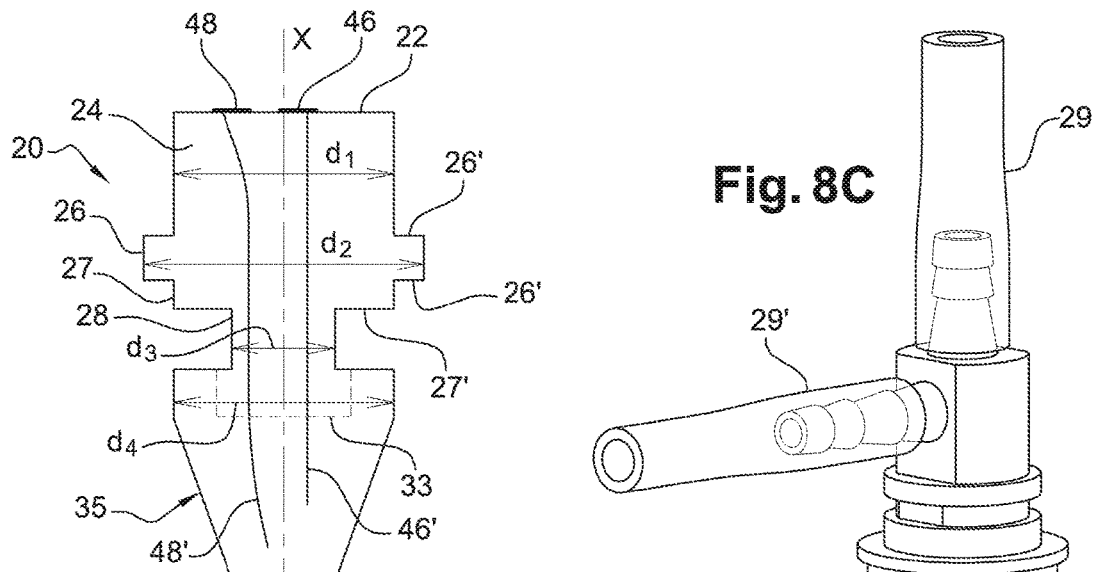
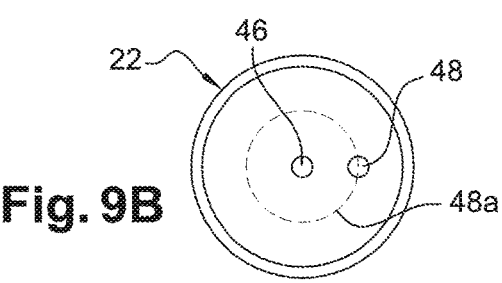

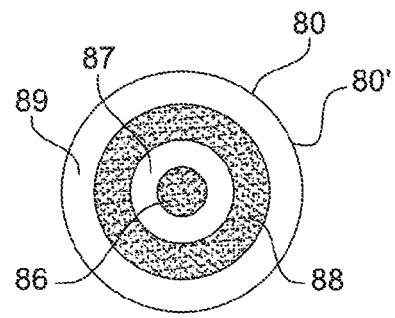
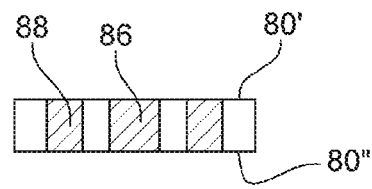
Fig. 10A    Fig. 10B
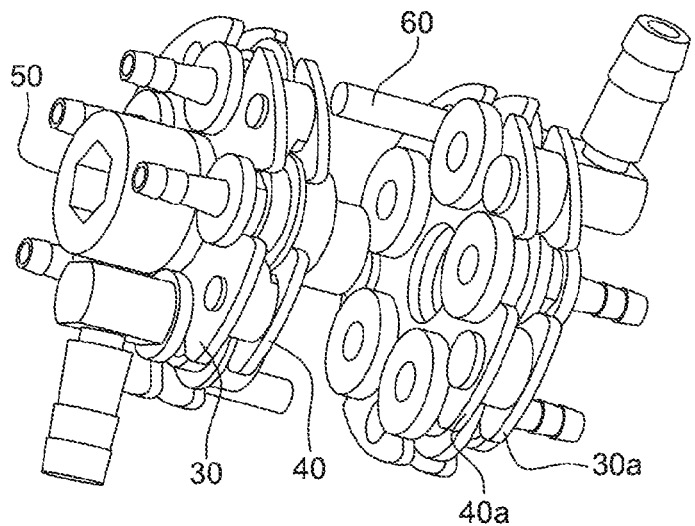
Fig. 11A
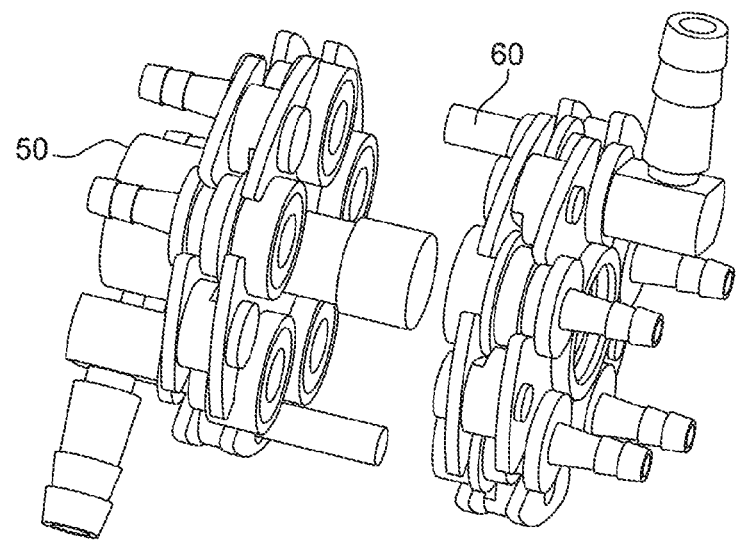
Fig. 11B

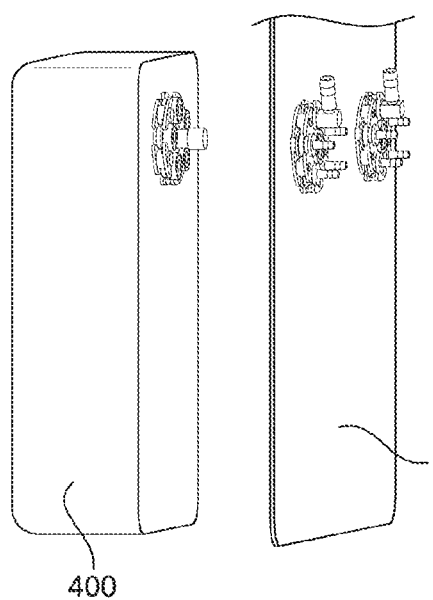
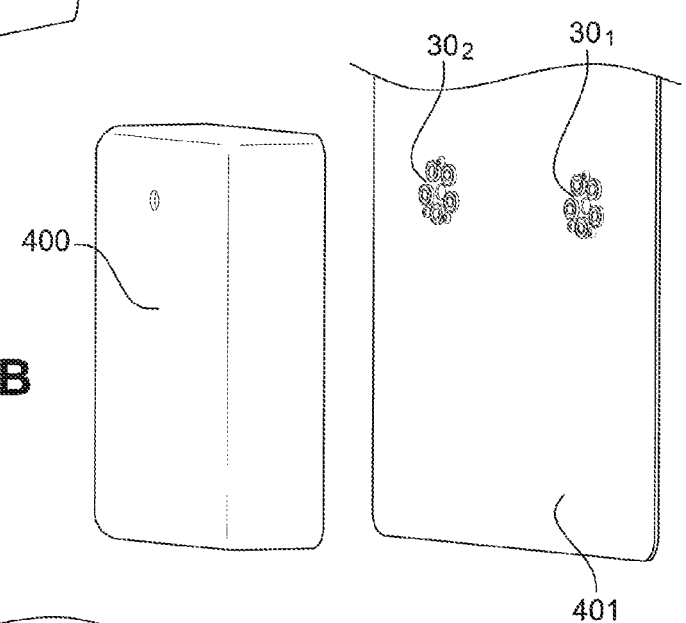
Fig. 14A
Fig. 14B
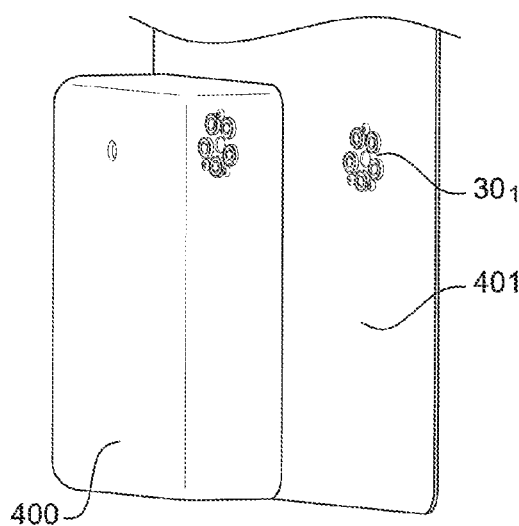
Fig. 14C

MODULE OF A PRINTER WITH A CONFIGURABLE CONNECTOR

TECHNICAL FIELD AND PRIOR ART

The invention relates to the field of continuous ink jet (CIJ) printers.

Continuous ink jet (CIJ) printers are well known in the field of industrial coding and labelling for various products, for example to label barcodes, expiration date on food products, or even references or distance marks on cables or pipes directly on the production line and at a high rate. This kind of printer is also found in some fields of decoration where the graphic printing possibilities of the technology are exploited.

These printers have several standard sub-assemblies as shown in FIG. 1.

First, a printing head 1, generally offset from the body of the printer 3, is connected thereto by a flexible umbilical 2 joining the hydraulic and electrical connections required for operating the head by imparting it flexibility which facilitates integration on the production line.

The body of the printer 3 (also called a console or cabinet) usually contains three sub-assemblies:
- an ink circuit at the lower portion of the console (zone 4'), which enables, on the one hand, ink to be provided to the head at a stable pressure and with a suitable quality, and, on the other hand, the jet ink not used for printing to be accommodated;
- a controller located at the upper portion of the console (zone 5'), capable of managing the action sequencing and performing processes enabling different functions of the ink circuit and of the head to be activated. The controller 5 can include for example a micro-computer or a micro-processor and/or one (or more) electronic board and/or at least one embedded software, the programming of which ensures driving the ink circuit 4 and the printing head 1. This controller allows the printing instructions to be transmitted to the head but also the system engines and valves to be driven in order to manage supplying ink and/or solvent to the circuit with as well as recovering the ink and air mixture from the head. It is thus programmed to that end,
- an interface which gives the operator means for implementing the printer and to be informed about its operation.

In other words, the cabinet includes 2 sub-assemblies: at the upper portion, the electronics, the electric supply, and the operator interface, and at the lower portion, an ink circuit providing pressurised ink, with a rated quality, to the head and the trough for recovering the ink not used by the head.

FIG. 2 schematically represents a printing head 1 of a CIJ printer. It includes a drop generator 60 fed with electrically conducting ink, pressurised by the ink circuit.

This generator is capable of emitting at least one continuous jet through a small dimension port called a nozzle. The jet is transformed into a regular succession of drops having an identical size under the action of a periodical stimulation system (not represented) located upstream of the nozzle outlet. When the drops 7 are not for printing, they are directed to a gutter 62 which recovers them in order to recycle unused ink to bring them back into the ink circuit. Devices 61 placed along the jet (charging and deflection electrodes) enable, by a command, the drops to be electrically charged and deflected in an electric field Ed. Consequently, they are deviated from their natural trajectory of ejection from the drop generator. The drops 9 for printing avoid the gutter and will be deposited on the medium to be printed 8.

This description can be applied to so-called binary or multi-deflected continuous jet versions of continuous ink jet (CIJ) printers. The binary CIJ printers are equipped with a head the drop generator of which has a multitude of jets, each drop of a jet can only be oriented to 2 trajectories: printing or recovery. In multi-deflected continuous jet printers, each drop of a single jet (or of some spaced jets) can be deflected to various trajectories corresponding to charging commands being different from one drop to the other, thus making a sweeping of the zone to be printed along a direction which is the deflection direction, the other sweeping direction of the zone to be printed is covered by relatively displacing the printing head and the medium to be printed 8. Generally, the elements are arranged such that these 2 directions are substantially perpendicular.

An ink circuit of a continuous ink jet printer enables, on the one hand, ink under a controlled pressure, and possibly solvent, to be provided to the drop generator of the head 1 and, on the other hand, a trough to be created to recover unused fluids for printing and which then come back from the head.

It also enables consumables (ink and solvent delivery from a reservoir) to be managed and ink quality (viscosity/concentration) to be controlled and maintained.

Finally, other functions are related to the user comfort and the automatic takeover of some maintenance operations in order to ensure a constant operation regardless of the conditions of use. Among these functions, there are the solvent rinsing of the head (drop generator, nozzle, gutter), preventive maintenance head, for example replacing components having a limited lifetime, in particular filters, and/or pumps.

These different functions have very different purposes and technical requirements. They are activated and sequenced by the printer controller which will be all the more complex as the number and sophistication of the functions are great.

To improve the manufacturability and testability of a machine as described above, the tendency is to split the ink circuits into physical modules corresponding most of the time to functional modules. These modules can be manufactured independently and then are assembled and interconnected to make the ink circuit which, in turn assembled to other subassemblies finally make up the printer. Connecting the modules of the ink circuit to each other and/or with the printing head requires the implementation of hydraulic and electrical connections to operationally interconnect these modules.

The present invention relates in particular to means for connecting modules facilitating design and modular manufacture of printers.

Hydraulic connections are known to be technical and often complex, because of reliability constraints as regards proofness, overall space, but also because of the easy disconnection need with, in some cases, a self-sealing capacity at the time of disconnection. In industrial printer type machines, the problem is particularly sensitive because of the number and of the diversity of the diameters of conduits as well as the nature of the fluids being conveyed, which are often flammable, which requires to ensure proofness.

Conventionally in market participants, hydraulic connections are further often made point by point using teflon or polyamide hoses and "fir tree" connections or unit connectors from the market.

A fir tree connection is made of a tube with a diameter slightly higher than that of inside the hose, this tube being equipped with concentric barbs having a low angle in the insertion direction of the hose (the flexibility of the hose allows an easy insertion) and a sharp angle in the extraction direction (the hose is thereby retained during an extraction).

The nature of the hoses enables a chemical compatibility to be ensured with fluids used and facilitates mounting thanks to the relative flexibility of the material; indeed in a compact ink circuit, the trajectory of the hoses can be rather tortuous. But these hoses remain however sufficiently rigid to support pressure, crashing or cracking (folding when the radius of curvature is too low). The wiring of this type of hoses is generally difficult.

This known solution (of the «fir tree» connection type) offers the advantage of some simplicity and a modest cost; but the connection is far from easy and is destructive because the hose should be cut off to release it from a fir tree connection.

On the other hand, this wiring technique is labour-intensive; it is ill-suited to the modular design of modern machines. If the need for multiple connections/disconnections exists, then the usual solution is to use hydraulic connectors, often of the unit type, which are costly and bulky.

The interconnection between modules can also require creating electrical connections, in the case, for example, where an electrical signal generated by a module is directly used by the module connected thereto. However, the control signals generated or used by a module and which are processed or made by the controller of the machine are not within this category; indeed, in this case, it is more judicious that the control electrical wires of a module are gathered on a connector which will be connected to the controller.

The connection of 2 connectors including several conduits and/or conductors requires a great accuracy for the relative positioning of the connectors, such that the individual connection of each conduit and/or conductor is properly lined up. This generates high costs.

The definition of the interface between 2 modules is most often specific (designed for 2 particular modules) in terms of number and characteristics of hydraulic and electrical junctions, because it depends on the functional cutting off into modules. This results in designing dedicated interfaces for each case.

Another exemplary solution from prior art is introduced in document WO03080346 by Markem-Imaje to connect the head of the umbilical itself, connected to the ink circuit and electronics in the console of the print.

The design of this connector should be made for a specific need, its assembly is complex and costly as regards the assembling time.

Document WO2012066354 (Domino) describes an interconnecting system for modules of an ink circuit. Once again, the design thereof is complex and specific to a single application, and its manufacture is expensive. Finally, the connection reliability depends on the quality of the relative positioning between the interconnected modules; on the other hand, the connection/disconnection is easy.

Generally:
point-to-point connections are ill-suited to modular architectures,
the standard hydraulic connection is often a unit one, because a great number of connectors is required, which is costly,
connecting/disconnecting modules can require multiple operations (for each unit hydraulic connector and the electrical connections),
it is necessary to design a dedicated connection (which is often complex) between modules or between module and umbilical or between 2 umbilicals,
generally, the relative positioning of individual junctions in a connector should be very accurate, thus restrictive for design,
the assembly of multiple connections, in particular hydraulic ones, on one connector is difficult because of the residual rigidity of the hoses in addition to the low overall space of a connector. After wiring a connector, its repositioning in space becomes, in some cases, difficult because of the rigidity of the hoses and their axial rotation blockage which creates high torsional forces.

There is thus a need for a readily configurable hydraulic and/or electrical connection system, that can be used without reconsidering design in each implementation and enabling an easy assembly.

DISCLOSURE OF THE INVENTION

This invention first relates to a terminal for making a connection of the hydraulic or electrical or optical type, including:
a cylindrical portion, including a contact end and having a first diameter ($d_1$), this end being provided with hydraulic or electrical or optical connection means,
a collar, with a diameter ($d_2$) higher than the first diameter ($d_1$), including a first face and a second face parallel to each other.

Then, going away along, the axis XX', from the contact end or from said collar, said terminal further comprises:
a throat, the bottom of which has a cross-section, in a plane perpendicular to the axis XX', having at least one arc of circle portion having a $3^{rd}$ diameter (d3) strictly lower than that of the collar 26, at least one planar part, and a part of this cross-section having a width with a value lower than the $3^{rd}$ diameter (d3),
the throat continuing with connection means, for connecting to at least one hydraulic conduit or one electrical cable or one optical fibre.

The bottom of the throat defines, in a plane perpendicular to an axis XX' along which the terminal extends, a convex shape.

The planar part of the throat forms a guide surface (for insertion into a support element).

The entire assembly comprising the cylindrical portion, the collar, the throat and at least part of the connection means, for example a basis, in particular a cylindrical basis, of said connection means, is solid, not flexible around the axis XX'.

Preferably, at least one of the 2 faces of the collar can form a bearing surface.

Such a terminal can have a rotational symmetry about an axis XX'.

Such a terminal can be provided to make:
a hydraulic type connection (or said terminal is a hydraulic type terminal or is a hydraulic terminal); said cylindrical portion then includes an internal part having the shape of a crown, in order to receive a seal, for example an O-ring or flat seal, and a conduit, which opens into the end, passes through the terminal,
or a connection of the electrical type (or said terminal is an electrical type terminal or is an electrical terminal); then, it includes conducting means ending with at least one conducting pad, for example at the surface of said end or set back from the same; according to one embodiment, at least 2 conducting pads are radially provided, at different distances from the centre of the surface in which they are located, for example the surface of said end, or set back from the same, or one is provided in the centre of this surface, for example in the centre of said end or of the surface set back from said end;

or a connection of the optical type (or said terminal is an optical type terminal or is an optical terminal); then, it includes conducting means ending with at least one transmitter or one receiver at the surface of said end; and/or it includes optical means, for example an optical fibre, an end of which being able, or not, to be flush with said contact end.

In the case of a connection of the hydraulic type, this can be made by pressing 2 hydraulic terminals facing each other, one (the first one) of the terminals including a seal, as explained above, the other (the second one) terminal also including a seal or having a planar surface against which the seal of the first terminal will be compressed.

According to an exemplary embodiment, said end forms a planar face. Alternatively, a surface, which bears the hydraulic or electrical or optical connection means, is set back from said end.

According to yet another exemplary embodiment, the throat can include:
2 portions in the shape of an arc of circle, separated from each other by 2 lands or flat surfaces, consisting of straight portions parallel to each other and distant from each other by a value B lower than the $3^{rd}$ diameter ($d_3$),
or a single portion in the shape of an arc of circle, and a single land (or flat surface), the greatest distance between the land and the circular shape, or the length from the median to the land, from the latter up to the perimeter of the circular shape, being lower than the $3^{rd}$ diameter ($d_3$).

An intermediate cylindrical portion, with a diameter strictly between that of the collar and the $3^{rd}$ diameter ($d_3$), can be provided between the collar and the throat. A surface of this cylindrical portion, which partly bounds the throat, can form a bearing surface.

The invention also relates to a device, or array, for holding terminals, in particular of the type described above, including a plate, provided with recesses each of which has an arc of circle portion and includes an aperture at the periphery of the plate. Each recess can have a diameter equal to that of the throat, or equal to that of the intermediate cylindrical portion.

Assembling a terminal according to the invention with such a holding device can be achieved by:
placing the terminal such that its throat is coplanar with the recess and the aperture chosen,
axially orienting the terminal such that the planar part (s) of the throat is lined up perpendicular to said aperture (or in, or along, the direction of introducing the terminal toward the aperture and the recess),
sliding the terminal into the aperture and then into the recess and turning the terminal along its axis so as to trap it into the recess.

Alternatively, it is the side face of the intermediate cylindrical portion, which comes in contact with the wall of the recess.

Said plate can have for example:
a circular shape, the recesses being provided as a circle at the periphery of the plate,
or an elongated shape, including 2 side portions and 2 ends, at least one of said recesses being formed in at least one of said ends and/or at least one of said recesses being formed in at least one of said side portions.

More generally, the plate can be of any shape, the recesses being distributed at its periphery.

Such a holding device can further include at least one bearing surface, set back from the edge of the arc of circle portion of one of said recesses and raised with respect to this edge.

For example, it can include 2 bearing surfaces, forming a step profile from the edge of the arc of circle portion.

It can further be provided a flange provided with recesses to be positioned facing each recess of the plate and means for attaching said flange facing said plate.

Such a holding device can further include angular orienting means, for example as a lug.

The invention also relates to a connector, including a device for holding terminals as described above, and further including at least one terminal, each of the type described above and inserted into a recess of said plate.

The invention also relates to a method for assembling 2 such connectors, wherein the end of the first connector is applied against the end of the second connector and they are held together by pressure.

In such a method, the first connector and the second connector can be held assembled by pressure using clamping means which pass at least partly through the first connector and the second connector along a direction substantially perpendicular to said plate.

The invention also relates to an electrical interface device, for example having a cylindrical shape, and also for example for terminals according to the invention, said interface device being made of an insulating material, including a conducting through centre portion which is cylindrical and/or at least one electrically conducting through—portion in the shape of a cylindrical crown.

The electrical interface device extends between two outside surfaces or faces which are parallel to each other. The through portions extend through, or traverse, the thickness of the electrical interface device, from one of said outside surfaces to the other.

The electrical continuity between 2 electrical terminals according to the invention placed facing each other is then made by inserting said electrical interface device between both terminals, each applied against a face of the interface.

An interface device according to the invention can be made as alternately conducting and insulating rings, each conducting ring corresponding to the radial position of a contact. In the centre, the radius is zero and the ring is reduced to a cylinder.

For example, such a device can include at least 2 electrically conducting through—portions in the shape of a cylindrical crown, separated by electrically insulating through portions in the shape of a cylindrical crown.

The invention also relates to a method for assembling a first electrical terminal and a second electrical terminal wherein the end of each terminal is applied against the surface of an electrical interface device according to the invention, said surface including conducting portions having a circular shape or in the shape of a crown, each in contact with a conducting pad of the surface of the end of one of the 2 terminals in contact with the same.

The invention also relates to a method for assembling a first terminal and a second terminal, each according to the invention, in which the end of the first terminal is applied against the end of the second terminal and they are held assembled by pressure.

BRIEF DESCRIPTION OF THE FIGURES

FIGS. 6A-6E represent embodiments of arrays according to the invention.

FIGS. 7A-7C represent step of an assembling method according to the invention.

FIGS. 8A-8C represent exemplary connections with a fluid conduit of a terminal according to the invention.

FIGS. 9A-9D represent an exemplary embodiment of various electrical terminals according to the invention.

FIGS. 10A and 10B represent an exemplary embodiment of an electrical interface device for electrical terminals according to the invention.

FIGS. 11A-11C represent an exemplary embodiment of assembling connectors according to the invention.

FIGS. 14A-14C represent an exemplary coupling of a case with a panel, using connectors according to the invention.

DETAILED DISCLOSURE OF EMBODIMENTS

Figure 3:
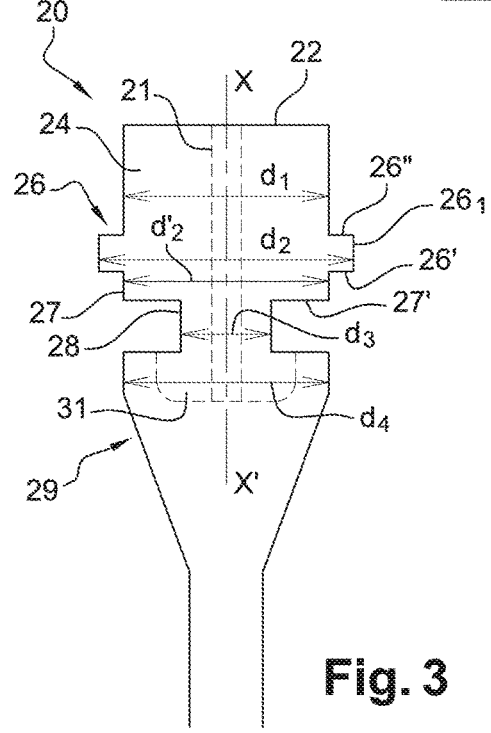
FIG. 3 schematically represents a principle axial cross-section of a terminal according to the invention.

One example of a structure of a terminal 20 according to the invention is illustrated in FIG. 3. Such a terminal substantially extends along an axis XX', which can be a rotational axis of the terminal or for most of the parts of the terminal (in particular the parts 24, 26 described below). This terminal is intended to be connected for example to a conduit, using a straight connection, provided in the axis XX' (provided as in FIG. 8B), or perpendicular to the same (provided as in FIG. 8A) or a combination of both, which enables a double connection to be made (FIG. 8C).

It can be a screw machine part or a moulded part, made about the axis XX'.

Figure 4:
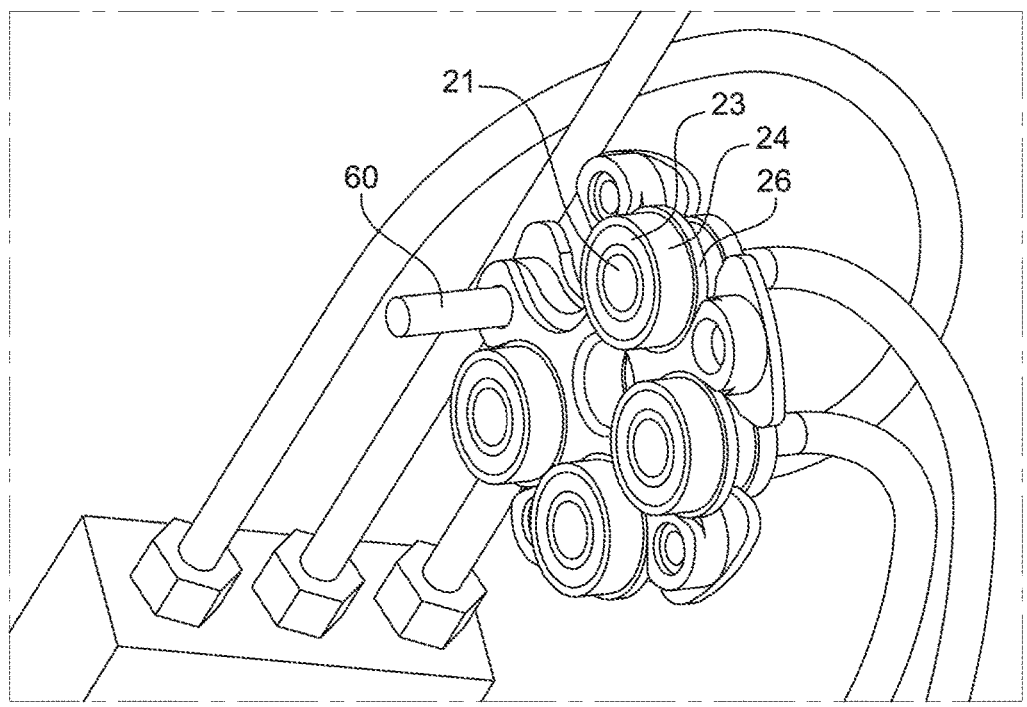
FIG. 4 represents a plurality of terminals assembled in an array.

This terminal 20 includes a contact end or face 22, of a cylindrical portion 24, with a diameter $d_1$, on or in which the specific functions of the terminal type are found: for example, the inside of this cylindrical portion bounds a well in the shape of a crown, in order to receive a seal, which can be an O-ring 23 (as illustrated in FIG. 4) or a flat seal; alternatively, the end 22 forms a planar face, for example for contacting with a terminal including a seal, such as an O-ring or a flat seal, or for accommodating electrical contacts, as described more in detail below.

The cylindrical portion 24 continues, on the side opposite to the end 22, by widening to form a cylindrical collar 26, or inscribed in a cylinder, with a diameter $d_2$ higher than the diameter $d_1$. The side surface $26_1$, the lower 26' and upper 26" surfaces (both of them are parallel to each other) of this collar 26 can form one or more bearing faces. The collar 26 also facilitates gripping the terminal.

Figure 5A:
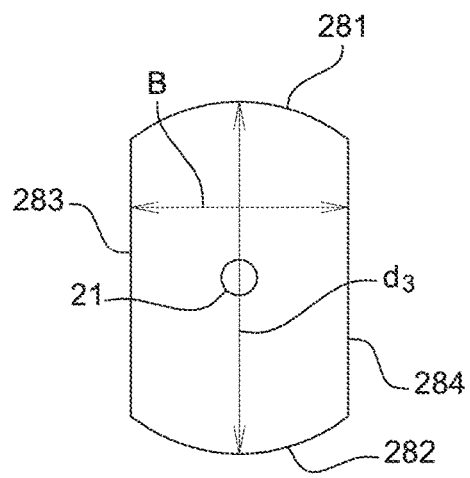
FIGS. 5A-5C are cross-sections of a throat bottom of a terminal according to the invention.
Figure 5B:
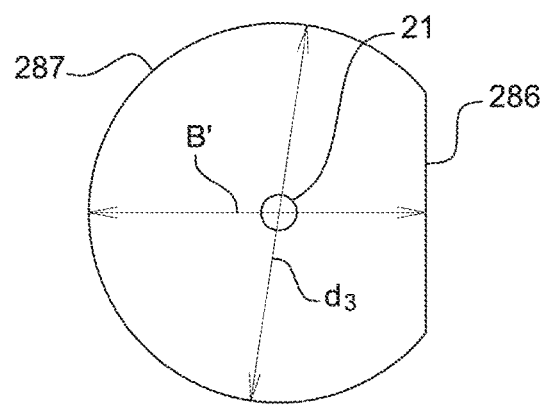

Then, there is, going further away from the face 22, a throat 28, the bottom of which has a cross-section, in a plane perpendicular to the axis XX', having 2 circular portions 281, 282, with a diameter $d_3$ strictly lower than the diameter $d_2$ of the collar 26; these 2 circular portions are separated from each other by 2 lands (or flat surfaces) 283, 284, consisting of straight portions parallel to each other (see FIG. 5A, which, as FIG. 5B, is a cross-section view of the throat, perpendicular to XX') and distant to each other by a distance B, strictly lower than the diameter $d_3$. As will be seen later, this shape with lands enables an array for accommodating one or more terminals to be introduced in an aperture. In one alternative, the cross-section of the throat bottom can only have a single land (or flat surface) 286 and a single circular portion 287 (see FIG. 5B); in this case, this is the distance B' between the land and the circular shape, or the length from the median to the land, measured from the same up to the perimeter of the circular shape, which is strictly lower than the diameter $d_3$. In one alternative (see FIG. 5C), the bottom of the throat 28 has a cross-section, in a plane perpendicular to the axis XX', having 2 circular portions 287, with a diameter $d_3$ strictly lower than the diameter $d_2$ of the collar 26; these 2 circular portions being separated from each other by 2 lands (or flat surfaces) 283', 284', consisting of straight portions parallel to each other and distant between them by a distance B'', strictly lower than the diameter $d_3$, but these 2 straight portions are of different lengths, the distance $B_1$ between one of them and the axis XX' being different from the distance $B_2$ between the other straight portion and the axis XX'.

Between the collar 26 and the throat 28, an intermediate cylindrical portion 27 can be provided, for example with a diameter $d'_2$ equal to that, $d_1$, of the cylindrical portion 24. There will be $d_3 < d'_2 < d_2$. Once again, the lower surface 27' of this portion, which bounds a part of the throat, can form a bearing face.

Figure 5C:
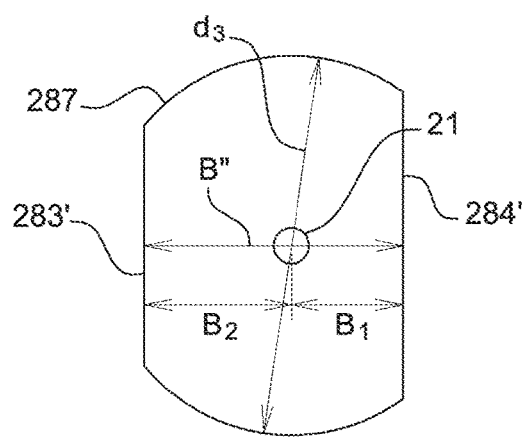

A terminal according to the invention thus includes several parts perpendicular to the axis XX', which are stacked, at least one first part of which has a contact face 22, a collar 26 with a diameter higher than the first (preceding) part, and a throat 28 the bottom of which has a circular part with a diameter strictly lower than that of the collar and has 2 lands (or flat surfaces) parallel on either side of the axis XX' (but which are not necessarily symmetrical with respect to the axis XX', as in FIG. 5C) or even a single land (or flat surface, FIG. 5B).

The rest of the terminal consists of the connection itself: the part forming the throat 28 is continued by means 31 for connecting to a conduit or hose 29, 29' for ensuring a straight connection, or a connection perpendicular to the axis XX' or a double connection, for example one being straight, the other being perpendicular to the axis XX'. These connection means include for example at least one «fir tree», or smooth, connection, directly machined or moulded in the part of the terminal. Other connection types can be used (quick inserting connection, . . . ).

The means 31 have a cylindrical basis. These means can have a diameter $d_4$ higher than $d_3$, or this is the set consisting of these means and the conduit or hose 29 which has a diameter higher than $d_3$.

The set of the terminal, including the cylindrical portion, the collar, the throat and the connection means, or at least part of said connection means, in particular said cylindrical basis, is solid and lined up along the axis XX', and is not flexible.

This solid set can then be continued with a flexible reinforcement enabling a cable (for example the conduit 29 of FIG. 3 or the cable 35 of FIG. 9A or 9C-9F), which is ended with a terminal according to the invention, to be bent without folding.

The connection means 31 may comprise a cylindrical basis, as can be seen on FIGS. 3, 8A, 8B, 9A, 9C-9F.

As illustrated in FIGS. 8A-8B, each terminal type can vary according to several connection configurations:
straight connection, in the axis of the terminal;
or connection bent at 90° or another angle.

Alternatively, a double connection, with 2 ways can be made:
in a T, for example with a straight outlet and a bent outlet (FIG. 8C);
or with 2 ways in a Y.

The diameters of the 2 ways can be different, so as to correspond to different hose diameters.

Finally, any other suitable configuration can be made.

A terminal according to the invention is preferably such that its axial position with respect to the conduits or conductors, can be any position.

The diameter of the connections can also vary to be suitable to that of the hoses.

Several terminals can have the structure just described. They can differ from each other in the connection (on the side of the hose or conduit 29, 29') and/or in the diameter of the passageway 21 of the hydraulic terminals. The diameter of the cylindrical portion 24 can be identical for all the terminals.

Figure 6A:
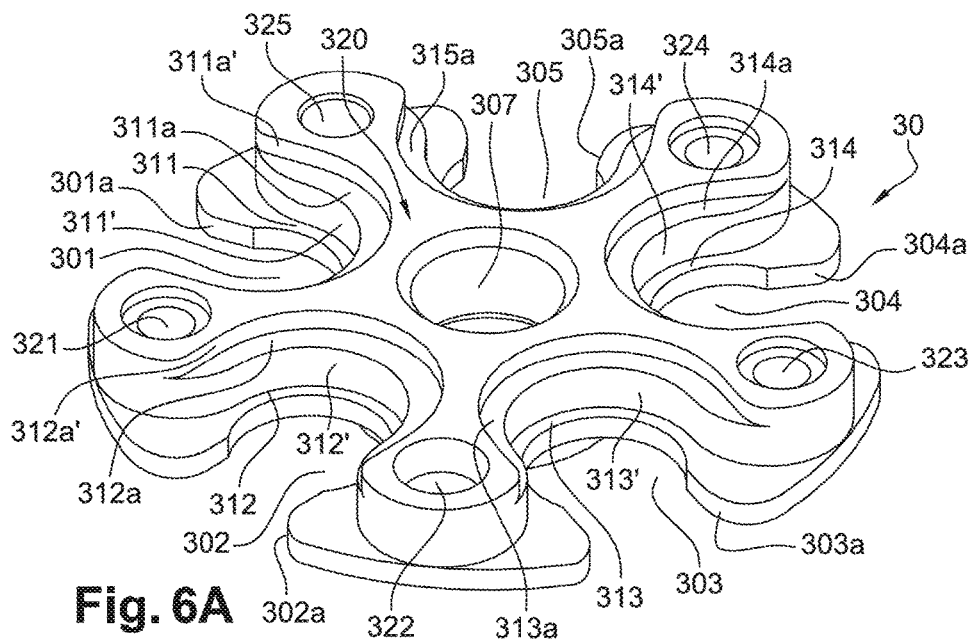
Figure 6B:
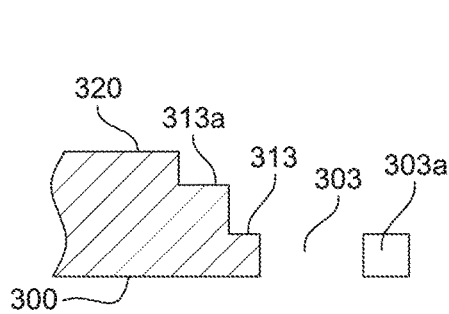
Figure 6C:
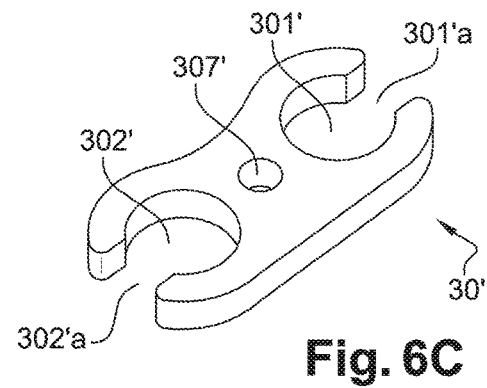
Figure 6D:
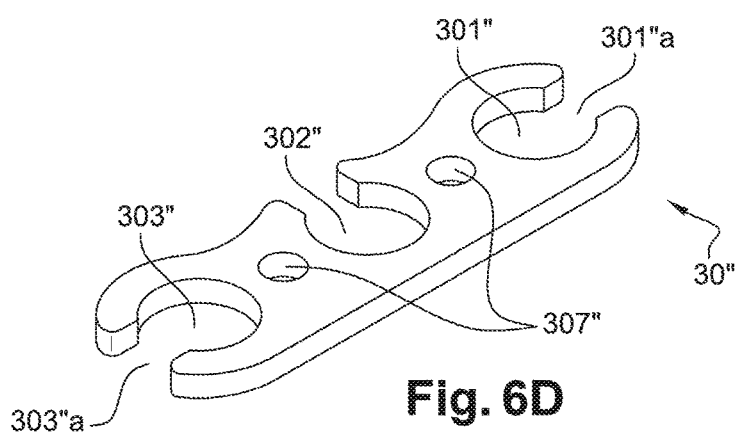

In order to accommodate one or more terminals of the type described above, an accommodating, or holding, array includes a plate 30, 30', 30" provided, on its rim, with circular recesses 301-305, 301', 302', 301", 302", 303" partly outwardly opened, as illustrated in FIGS. 6A, 6B, 6C. These recesses are for example provided as a circle (FIG. 6A), or are lined up (FIG. 6C, FIG. 6D). The diameter of these recesses corresponds, or is substantially equal, to the diameter $d_3$ of the circular portion(s) 281, 282, 287 of the throat 28. Alternatively, the diameter of these recesses corresponds, or is substantially equal, to the diameter $d'_2$ of the intermediate cylindrical portion(s) 27. The shape of the array depends on the number of terminals to be gathered.

Preferably, the width of each aperture 301a-305a, 301'a, 302'a, 301"a, 302"a, 303"a of the recesses corresponds, or is substantially equal, to the distance B between the lands or to the distance B', respectively B", in the case of FIG. 5B, respectively 5C. This width is therefore less than the diameter of the recesses 301-305, 301', 302', 301", 302", 303".

In the embodiment of FIG. 6A, a $1^{st}$ surface 311, 312, 313, 314, 315, perpendicular to a direction parallel to the axis XX', can be provided, which continues the edge of the circular part of at least one of the recesses (or each of them) and which can form a $1^{st}$ bearing surface, for the surface 27' of the cylindrical portion 27, intermediate between the throat 28 and the collar 26 (FIG. 3). This surface is bound, toward the inside of the array, by a $1^{st}$ wall 311'-315' which is perpendicular thereto.

A $2^{nd}$ surface 311a, 312a, 313a, 314a, 315a, itself set back from the edge of the circular part of the recesses, but also with respect to the $1^{st}$ surface 311-315, and raised relative to this edge, can be provided; it can form a $2^{nd}$ bearing surface for the collar 26 (FIG. 3). This surface is itself bound, toward the inside of the array, by a $2^{nd}$ wall 311a', 312a' which is perpendicular thereto. An array can be made with a single bearing surface level, for example only the bearing surfaces 311-315, without the bearing surfaces 311a-315a. Or, only the surfaces 311a-315a act as a bearing surface; the surfaces 311-315 are then not necessarily used as a bearing surface.

Finally, a centre upper surface 320, perpendicular to the axis XX' ends the device. Such an array has for example a thickness (distance between the planes 300 and 320, see FIG. 6B) between 4 and 10 mm. Its diameter can be between 20 mm and 50 mm, it is for example 35 mm.

The cross-section profile of an aperture 303 and of the surfaces and walls surrounding it is represented in FIG. 6B. It can be seen a profile in the form of 2 steps, which is ended with the upper surface 320.

One or more bearing surface levels can be provided for the embodiments of FIGS. 6C and 6D. A single level array, as that of FIGS. 6C and 6D, has for example a thickness (distance between the upper and lower planes) between 1 and 5 mm.

Figure 11C:
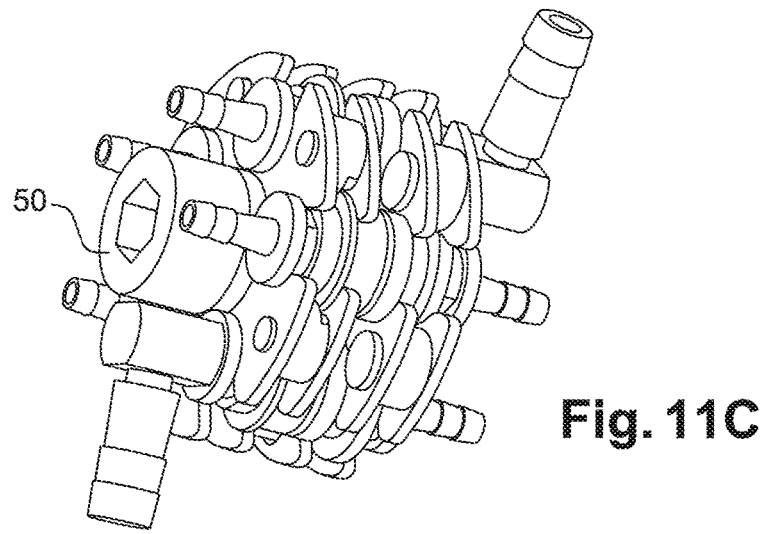

Each array can be provided with means 307, 307', 307" for accommodating means for attaching the array, such as the means 50 illustrated in FIGS. 11A-11C. This attachment can be intended as an attachment or a clamping against an array of the same type, provided itself with hydraulic (or electrical or optical in the alternatives set out below) terminals.

Each array can further be provided with ports 321-325 intended to accommodate means for attaching a flange 40 such as described later. These ports can be continued by threaded holes made in the bulk of the material of the array.

Figure 13A:
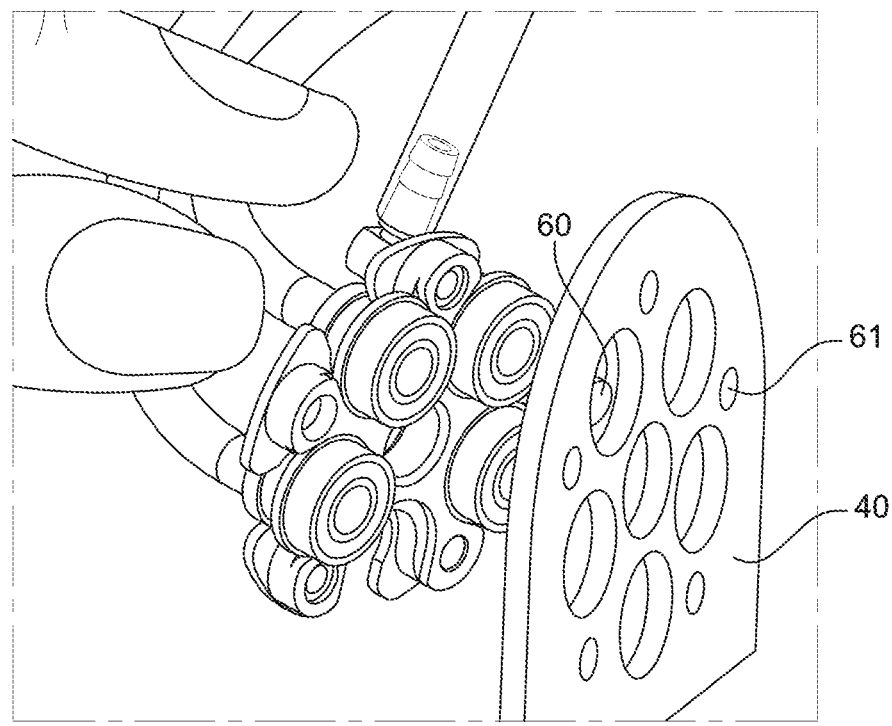
FIGS. 13A and 13B represent an exemplary assembly of a connector according to the invention with a base.
Figure 13B:
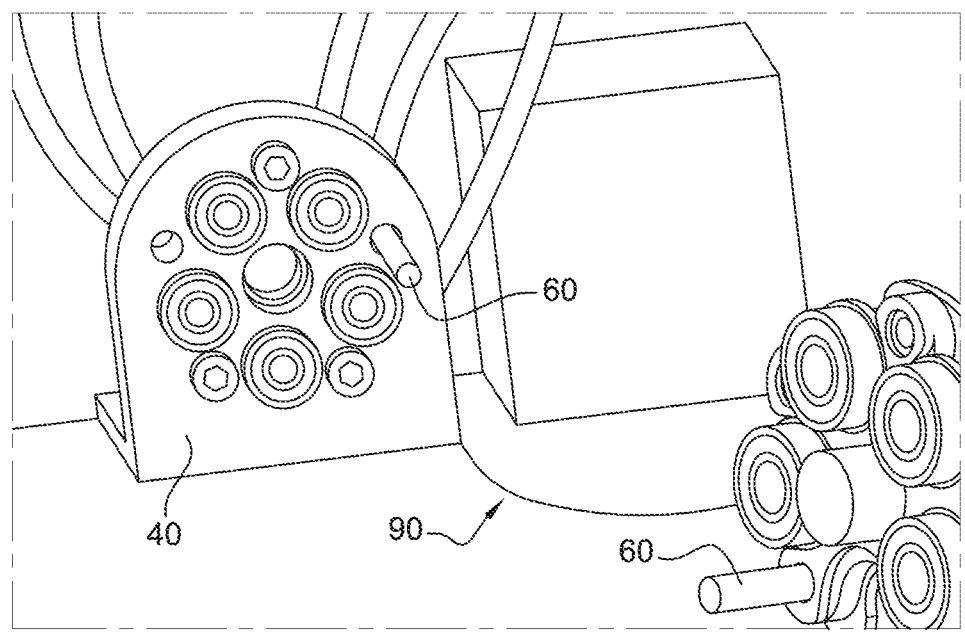

Such an array can include foolproofing means 60 as for example, a lug or a pin, as illustrated in FIGS. 7C, 11A, 13B. Such a lug can be positioned in one of the ports 321-325.

Such a holding array enables terminals to be gathered according to an implanting pattern, defined by the position of the apertures 301, 302, . . . and their contact face 22 to be put in a so-called interface plane.

More generally, the terminals are not necessarily in the same plane. In FIG. 6E, the case of an array 30a is represented, the extension of which is not planar, including 2 planar parts parallel to each other, but not located in a same plane, each part including at least one recess 301b, 302b, each enabling a terminal according to the invention to be accommodated. These 2 parts are for example connected by a plane forming an angle α with each of them.

In order to insert a terminal into a circular recess 301 of an array, the procedure is as illustrated in FIGS. 7A-7C (the case of an array of the type of FIG. 6A has been represented, but the principle remains the same for the other forms of array, and in particular for those of FIGS. 6C and 6D):
the terminal is presented such that the circular recess 301, for receiving the terminal, and the corresponding aperture 301a, are in a same plane as the throat 28 of the terminal,
the terminal is axially oriented such that the land(s) 283, 284, 286 can penetrate the aperture 301a of the recess 301 chosen,
the terminal is introduced into the recess, by a movement (illustrated by an arrow in FIGS. 7A and 7B) along a direction perpendicular to the axis XX', in the case of FIG. 6A, the face 26' of the collar 26 bearing against the corresponding bearing surface 311a, and/or the face 27' of the intermediate portion 27 bearing against the surface 311,
and a rotation of the terminal is made with respect to the array (along an axis parallel to XX') to trap it into the recess while leaving it an axial rotation freedom.

Figure 12:
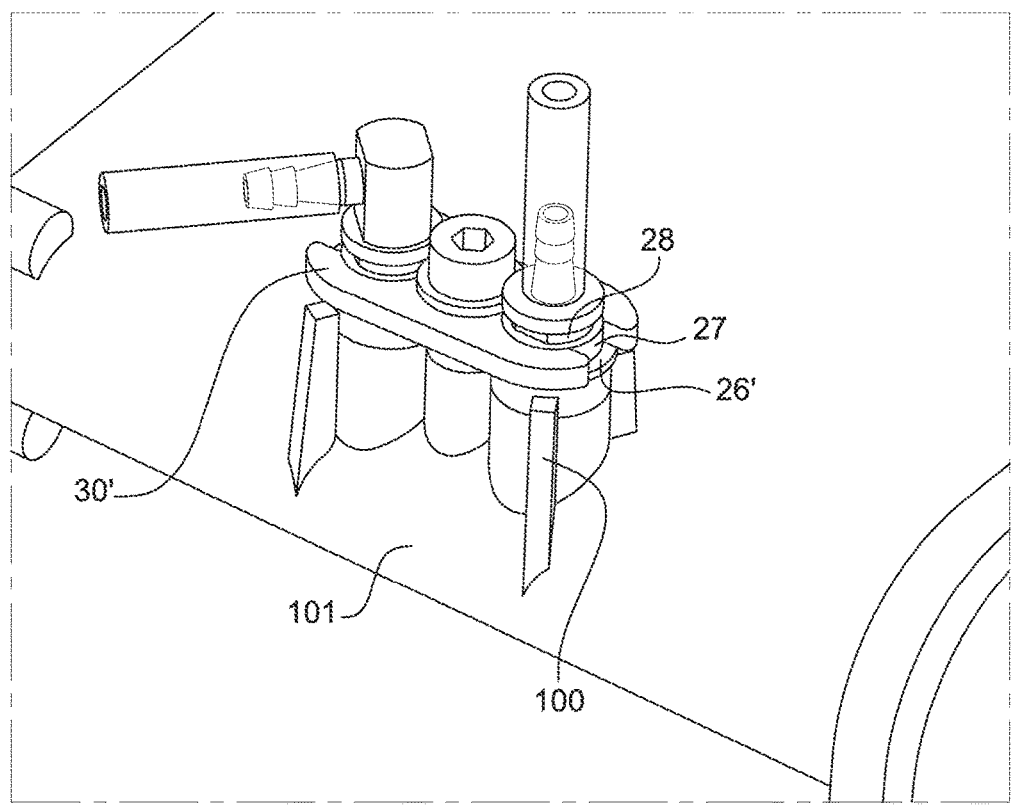
FIG. 12 represents an exemplary assembly of a connector according to the invention with a support.

According to one alternative, it is the side edge of the intermediate cylindrical portion 27 which is held in a circular recess such as 301 (as illustrated for example in FIG. 12). In this case, the cable or conduit to which the terminal is connected is slid by one of the side apertures

301*a*-305*a*, 301'*a*, 302'*a*, 301"*a*, 302"*a*, 303"*a* of the array chosen, and then the distance between the same and the terminal is reduced by a relative translation of these 2 elements (along the axis XX'), for bringing the surface 26' bearing against the array.

A terminal 20 as described above can be of the hydraulic type.

The face 22, perpendicular to the axis XX', can be such that, through its centre, a port passes, which terminates a coaxial passageway 21 (see in FIGS. 3, 5A and 5B), which opens, on the opposite side to the face 22, through a connection for connecting with a hose 29. The axial position of the terminal with respect to the conduit (and with respect to an array such as one of those described above) can be any position, on the other hand this terminal can advantageously be rotatably free about XX'.

According to an exemplary use, the contact face of a terminal, provided with a throat enabling a seal 23 (of the type of FIG. 4), to be inserted therein is applied against the contact face of another terminal, of the same type (that is with a throat in which a seal is positioned) or of the planar type (the face 22 is then planar, except for the passageway 21).

The seal 23 can then be flat crushed against the contact face, or against the seal, of the other terminal, thus creating proofness between the aligned coaxial passageways of both terminals and the outside; the continuity of the hydraulic conduit is thus ensured. The advantage of this connection type is its tolerance to slight misalignments of the axes of the 2 terminals; this tolerance is shifted to the relative positioning of the 2 connectors or bases.

Alternatively, the terminal can be provided for one or more electrical connection(s), on the same interface.

Overall, the external structure of an electrical terminal, illustrated in FIG. 9A, is then the same as that described above, in particular in connection with FIG. 3. In this case, the electrical terminal is mainly made of an electrically insulating material.

On the side of the connecting means 33, the following solutions can for example be used for connecting the wires of the cable: connection by solder pins, or by crimping, or by contact with overmoulded wires, or with pads provided with screws. The cable can come out, at the rear of the terminal, through a screwed, clipped, or welded cap. Such an electrical terminal can then be accommodated in an array such as one of those described above, in particular in connection with FIGS. 6A-6D.

The internal structure and the structure of the face 22 of the terminal will be different from that of a hydraulic terminal.

They are designed as coaxial connectors with 1 or 2 (or possibly more) electrical contacts.

In one example (illustrated in FIGS. 9A and 9B), the internal volume of the cylinder 24 can be solid or nearly solid, the face 22 including electrical contacts, or conducting pads, 46, 48, electrically connected to electrical conductors 46', 48' or electrical recontacts or electrical contacts located at the rear of the terminal, enabling them to be connected (welding or crimping) to an electrical cable.

As can be seen more in detail in FIG. 9B, on the contact face 22 of the terminal, each of the conducting pads 46, 48 is placed in the centre of the face or distant from this centre, for example on a virtual crown or a virtual circle 48*a*. Different pads, not provided in the centre of the face 22, can be provided on virtual crowns or virtual circles which are concentric and different from each other.

In the case of a single contact, this can be the centre pad 46 of FIG. 9B. In the case of several contacts, each can be placed to a different distance, with respect to the centre of the face 22, from the distance where the other contacts are placed. In other words, each virtual crown or circle corresponds to the radial position of a contact and the crowns are disjoined.

In order to ensure contact between the 2 contact faces of such identical electrical terminals, placed facing each other, between these contact faces, a pellet 80 (FIGS. 10A and 10B) can be inserted (the thickness of which is for example lower than its width) made for example of an elastomeric material, a part 86, 88 of which is conducting whereas the other part 87, 89 is insulating, the conducting parts passing through the thickness of the pellet and appearing on each of its faces 80', 80"; thus, according to the example illustrated in FIGS. 10A (top view) and 10B (cross-section view), a pattern of successively conducting (86, 88) and insulating (87, 89) concentric rings is formed, in the thickness of the pellet. The pellet has for example a cylindrical shape, the thickness of which being for example lower than its diameter.

The conducting rings of the pellet are provided so as to be facing virtual crowns corresponding to each pad of an electrical terminal such as described above; thus, when the end faces 22 of the terminals are provided facing each other, each conducting ring of the pellet establishes the electrical continuity between the pad of a terminal and a pad of the other terminal. For example, the ring 88 of FIG. 10A is in electrical contact with the pad 48 of FIG. 9B. The latter can be provided at any point of the circle 48*a*, it will be always in contact with the ring 88.

This greatly facilitates assembling 2 electrical terminals, since the radial positioning of one of the 2 terminals with respect to the other has not to be taken into account, the electrical connections being ensured in any case by the conducting tracks of the corresponding pellet 80.

Further, the dimension, in the plane of the face 22, of the pads 46, 48 and the width of the conducting rings 86, 88 of the pellet 80 can be defined to allow for a tolerance on the relative axial positioning of the 2 terminals facing each other, the diameter of each pad being lower than the width of the corresponding conducting ring, with which it is intended to come in contact, of the pellet.

Assembled terminals facing each other via the pellet 80 can be identical, which restricts the number of parts to be designed.

The pellet 80 can be dimensioned, in thickness and hardness to react in the same way as the seals of the hydraulic terminals such that the pressure remains balanced upon joining the 2 electrical parts of a configurable connector.

As for the hydraulic terminals, a pressure junction can be implemented. The junction of 2 mixed connectors can be made by tolerantly positioning the interfaces facing to each other and applying a pressure between these interfaces.

Another implementation of the electrical terminals can be made by using commercially available plug-in male and female coaxial contacts (or manufactured on the principle of these contacts from the market). In this case, the unit or coaxial contacts are integrated to the centre of the faces of the terminals and the junction is made by plugging the male and female parts (which are for example similar to the male and female connectors of a television antenna jack).

In another example (illustrated in FIG. 9C), the internal volume of the cylinder 24 is only partly filled: a face 22', set back from the face 22, includes electrical contacts, or conducting pads, 46c, 48c, electrically connected to electrical conductors 46', 48' or electrical recontacts located at the rear of the terminal, enabling them to be connected (welding or crimping) to an electrical cable.

In one alternative (illustrated in FIG. 9D), the internal volume of the cylinder 24 is only partly filled: a face 22', set back from the face 22, includes electrical pads, or plugs 46p, 48p, which project from the surface 22', and which are possibly retractable in the same. They are electrically connected to electrical conductors 46', 48' or electrical recontacts located at the rear of the terminal, enabling them to be connected (welding or crimping) to an electrical cable.

In a top view, the structure is once again that of FIG. 9B. Different pads, not provided in the centre of the face 22', can be provided on virtual crowns or virtual circles which are concentric and different from each other.

Figure 9C:
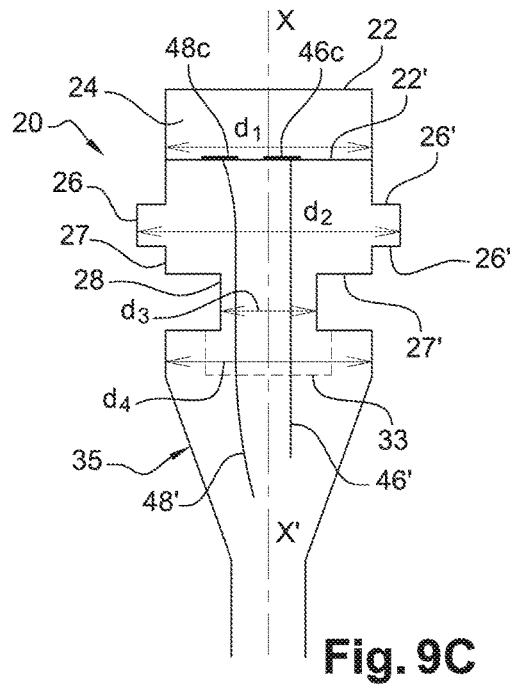
Figure 9D:
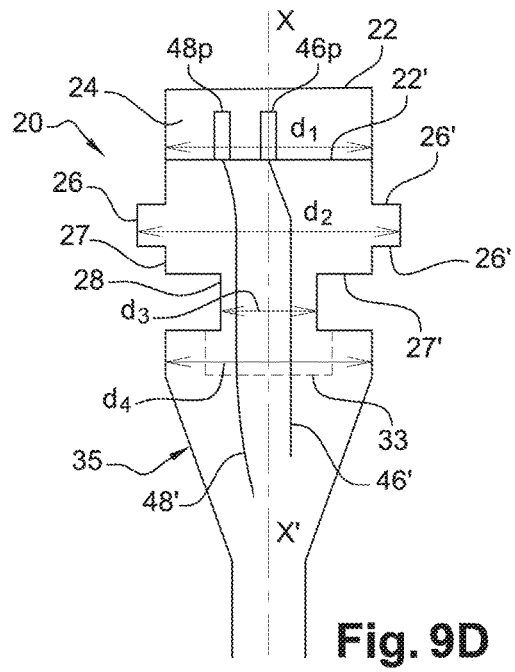

The conducting pads, 46', 48' of FIG. 9C and pads, or the ends of the electrical plugs 46p, 48p, of FIG. 9D, come in contact, for example, with a pellet 80, as described above, intended to be provided in contact with another electrical connector. In other words, the pellet 80 is provided between the contact faces of the 2 electrical terminals according to the invention.

Alternatively, an optical terminal can be made to transfer light information coming from optical sensors for example, or for transmitting digital data in an optical way. In this case, the terminal structure can be that of FIG. 9E, being essentially similar to that of FIG. 9A, reference 460 designating an optical fibre which passes through the centre of the terminal, being the same with the axis XX' or being along said axis. The faces of 2 such optical terminals being facing each other then enable light waves to be transmitted.

Figure 9E:
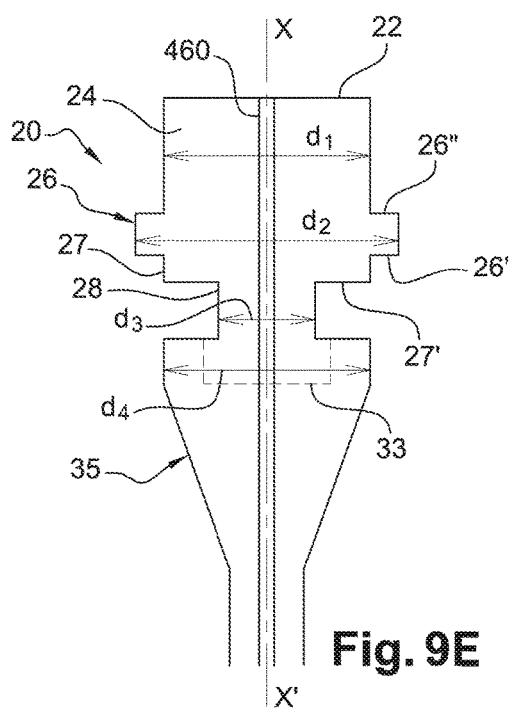
FIGS. 9E and 9F represent exemplary embodiments of optical terminals according to the invention.

The end of the fibre can be flush with the surface 22 (as in FIG. 9E). Alternatively, the end of the fibre can be set back from this surface 22 (in this case, there is, in the part 22, a well in the shape of a crown), such that an optical element, for example a lens, can be provided as an interface between this optical terminal and another optical terminal, for an efficient optical transmission.

Figure 9F:
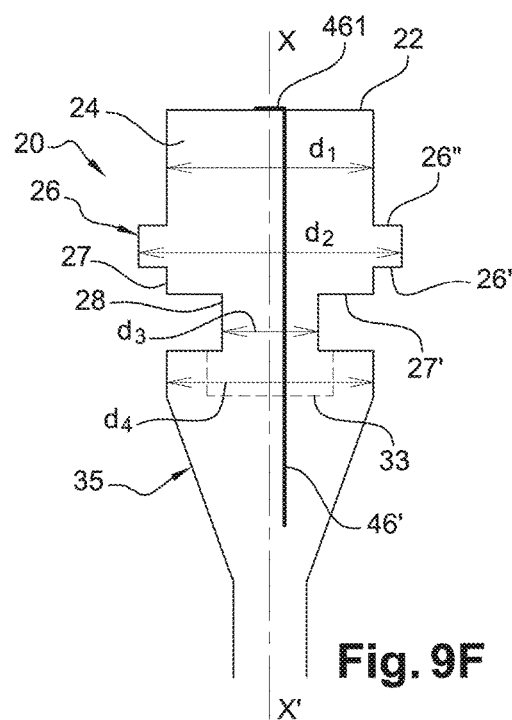

Further alternatively to the terminal structure of FIG. 9A, as illustrated, in FIG. 9F, an optical terminal can be made including a transmitter (led), and/or a receiver 461, in the centre of the face 22, at the end of a conductor 46'. Assembling 2 such terminals facing each other, one including a transmitter and the other a receiver, then enables an optical junction to be made.

Hydraulic, respectively electrical or optical terminals, described above, are, firstly, individually wired on hoses, respectively electrical wires or optical fibres or else at the time of manufacturing. This operation can be easily made, without space or angular positioning (orientation) constraint of the terminal with respect to the hose or a wire; this will be naturally placed, without torsion (at rest).

Upon inserting an accommodating or holding array, the hydraulic or electrical or optical terminals can be, as explained above, laterally inserted; they are retained entrapped therein while being rotatably freely positioned as a function of the forces which minimize the stresses on the hoses or electrical wires. In the case of bent outlets, the angular positioning of the terminal will be made with respect to the natural direction of the hose or wire.

As illustrated in FIG. 7A, a flange 40, circularly recessed at each contact face of the terminals, can be provided to bear against the upper surface 26" of the collars 26 of the terminals (see FIG. 3). They then are immobilized by pinching between the array, in particular one of the holding surfaces 311a-315a thereof, and the flange 40, using clamping means; the latter include for example one or more screws 41-43, which can be laterally provided, to be inserted in ports 321-325 of the accommodating array.

The array and the flange 40 have a configuration suitable to the number of terminals to be implemented. Thus, there will be arrays for 1, 2, 3, . . . N hydraulic and/or electrical and/or optical terminals. The distribution of connection points between array and flange can thereby be investigated at best to distribute the pinching force over all the terminals. The array and flange can also be specifically designed for a given application in order to optimize the positioning of the terminals for example.

The presence of a flange is not always necessary: indeed, the array provided with the terminals can be directly applied on a base for example, as illustrated in FIGS. 13A-13B.

By connector, it is meant the assembly including an array of the type described above and several hydraulic and/or electrical or optical conduits, being assembled or to be assembled with the array as described above. Thus, in an integral element, individual connection functions of each of the conduits and/or conductors and/or optical means can be gathered, these opening onto an interface that can be united with another connector or base, with a symmetrical interface (mirror or related) in order to ensure hydraulic and/or electrical or optical continuity to conduits and/or conductors and/or optical means associated with this other connector or base. The invention is in particular applicable to the manufacture of a mixed connector including at least one hydraulic terminal and/or at least one electrical and/or optical terminal.

An exemplary junction of 2 connectors according to the invention is illustrated in FIGS. 11A-11C (in the case of 2 arrays of the type of FIG. 6A); the 2 connectors are joined by pressure one against the other, their arrays being, once being oriented for the terminals to be facing each other, moved closer to each other. This coupling mode can be made using attaching means, for example using one or more screws and bolts or threaded holes. Preferably, a single screw 50 is centrally placed on the arrays, which enables a distribution of the forces and a coupling of the connectors to be ensured. But a connector can use an array partly equipped with terminals; in this case, preferably, the coupling system enables the pressure force to be equally distributed on all the terminals.

Alternatively, illustrated in FIG. 12, a connector, including an array 30' (of the type of FIG. 6C in this example) can be in contact with a support, or a base 100, implemented on a mechanical support 101 associated with a module and which has an interface, provided with apertures of channels and/or electrical connections intended to the connector. In an ink jet printer, for example of the CIJ type, the module in question can be for example an ink or solvent tank, or a filter, or a tray or any other support receiving or supporting a pump, in general any element of an ink circuit in which at least one hose and/or at least one conductor (of a level sensor for example) has to be connected.

The array can include foolproofing means 60 in the form, for example, of a lug or a pin judiciously placed on the array of one of the connectors and a hole in that of the other. Associated with another fixed point, as the coupling screw 50 for example, this function enables the relative orientation of the connectors to be made unique at the time of coupling and thus the aligning up of the terminals to be ensured. A foolproofing member, or lug or a pin 60 is illustrated in FIGS. 4 and 11A, 11B, 13A-13B. On the same, it is inserted into a corresponding port 61 of a holding base 40 which is, for example fixed with respect to device 90. One or more of these foolproofing lugs can use the location of a screw for attaching the flange. Thereby, in FIG. 13B, a lug 60 takes the place of a holding screw; the tray 40 has herein the same function as a flange.

The base 40 can be attached to, or integrated with, the cabinet or the structure of a printer, for example of the CIJ type, in order to connect, for example the umbilical of the head. In FIGS. 14A-14C, a case where an external module 400 is set up against a panel 401, which is for example the face of the cabinet of the control means of a CIJ type ink jet printer is represented. The 2 elements are coupled via, and coupled by hydraulic connectors according to the invention; in FIGS. 14A-C, 2 hydraulic connections $30_1$, $30_2$ can be seen, each including an array and the terminals according to the invention, which will come in contact with corresponding connections provided in the case 400.

Previous steps for wiring the module have been described above in connection with FIGS. 7A-7C.

The invention provides a system allowing the configuration on demand of a complex hydraulic or mixed (hydraulic and electrical and/or optical) connection between ink circuit modules, or between ink circuit and printing head, or between ink circuit and an assembly, or a kit, for an external draining or maintenance (for example an accessory system for aiding in maintaining a printer).

It enables several hydraulic conduits and/or electrical wires and/or optical means to be joined, in a single operation.

It allows some tolerance on the relative position of the two parts of the junction.

It facilitates wiring by setting up individual terminals under advantageous conditions (overall space, absence of hindrance related to the hose rigidity) which are then gathered on an array.

It allows a natural placement, by minimizing the constraints, of conduits and wires before immobilizing the terminals.

One of the parts of the junction can be integrated as a base on an element of the module.

An ink circuit of an ink jet printer, with its possible ink and solvent cartridges, is described for example in document FR 13 52925 (WO2014/154830) or WO2009/047510.

It is reminded that the ink circuit mainly provides the following functions:
  suitable quality pressurised ink supply to the drop generator of the head 1,
  recovery and recycling of the fluids non used to print back from the gutter of the head 1,
  sucking for the draining of the drop generator located in the head 1,
  solvent supply to the head 1 for rinsing performed during head maintenance operations.

Figure 1:
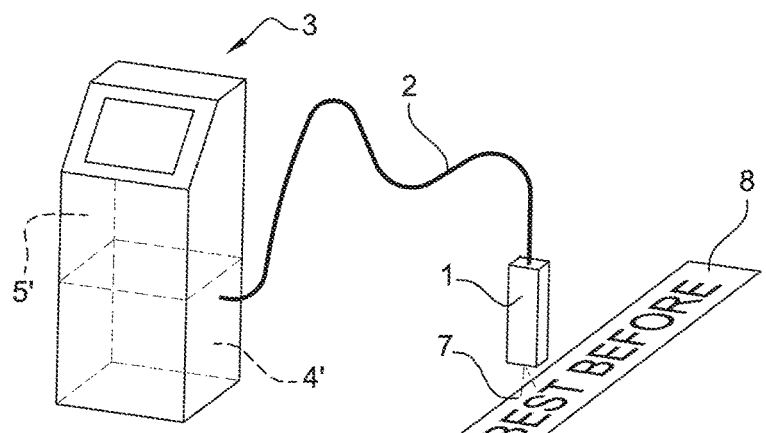
FIG. 1 represents a known printer structure.
Figure 2:
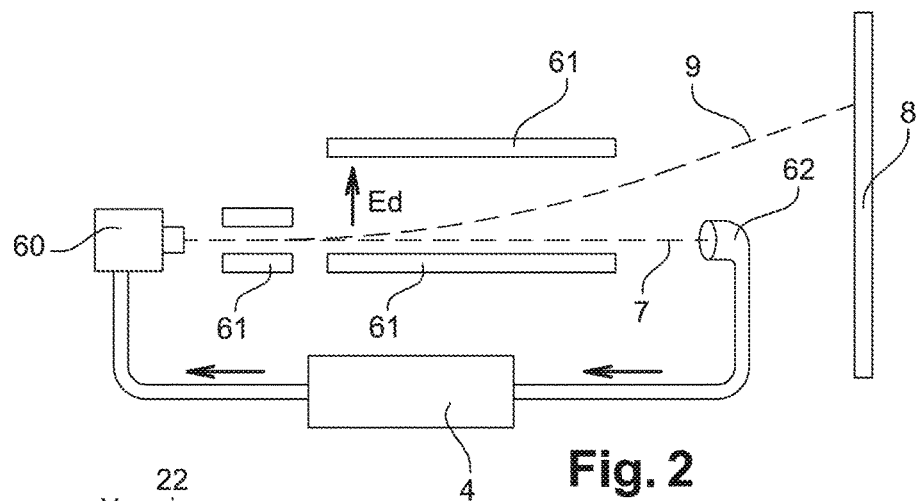
FIG. 2 represents a known structure of a printing head of a CIJ type printer.

The invention can be implemented in a continuous ink jet (CIJ) printer as the one described above in connection with FIGS. 1 and 2. This in particular includes a printing head 1, generally offset with respect to the body of the printer 3, and connected to the same by means, for example as a flexible umbilical 2, gathering the hydraulic and electrical connections enabling the head to be operated. Exemplary applications of this printer type have been given above.

The invention claimed is:

1. A detachable module of a printer comprising a case, one wall of said case being provided with at least one terminal for making a connection of the hydraulic or electrical or optical type in said printer, the terminal extending along an axis XX', and having an external surface including:
  a cylindrical portion, including a contact end and having a first diameter (d1), the contact end being provided with hydraulic or electrical or optical connection means,
  a collar, having a diameter (d2) greater than the first diameter (d1), including a first face and a second face, parallel to each other, wherein at least one of the first face and the second faces forms a bearing surface,
  and along the axis XX', extending from a body of the contact end:
  a throat, having at least one planar part having a surface parallel to the axis XX', the bottom of said throat having a cross-section, in a plane perpendicular to the axis XX', having at least one arc of circle portion having a $3^{rd}$ diameter (d3) strictly less than the diameter of the collar and at least one straight part, and a part of this cross-section having a width with a value lower than the $3^{rd}$ diameter (d3),
  the throat continuing with a connector, for connecting to at least one hydraulic conduit or one electrical cable or one optical fibre of the printer.

2. The detachable module according to claim 1, said module comprising at least one of an ink tank or a solvent tank, or a filter, or a tray or a support receiving or supporting a pump, or a part of an ink circuit in which at least one hose and/or at least one conductor has to be connected or an assembly for external draining or maintenance of said printer.

3. An assembly of a detachable module according to claim 1 and a panel in said printer also provided with at least one terminal of the panel for making a connection of the hydraulic or electrical or optical type in said printer, said at least one terminal of the panel extending along an axis XX', and having an external surface including:
  a cylindrical portion, including a contact end and having a first diameter (d1), the contact end being provided with hydraulic or electrical or optical connection means,
  a collar, having a diameter (d2) greater than the first diameter (d1), including a first face and a second face, parallel to each other, wherein at least one of the first face and the second faces forms a bearing surface,
  and along the axis XX', extending from a body of the contact end:
  a throat, having at least one planar part having a surface parallel to the axis XX', the bottom of said throat having a cross-section, in a plane perpendicular to the axis XX', having at least one arc of circle portion having a $3^{rd}$ diameter (d3) strictly less than the diameter of the collar and at least one straight part, and a part of this cross-section having a width with a value lower than the $3^{rd}$ diameter (d3),
  the throat continuing with a connector, for connecting to at least one hydraulic conduit or one electrical cable or one optical fibre of the printer.

4. An assembly according to claim 3, said panel being a face of a controller of said printer.

5. An assembly of a first detachable module according to claim 1 and a second detachable module according to claim 1.

6. The detachable module according to claim 1, said terminal being for making a connection of the hydraulic type, said cylindrical portion including an internal part in the shape of a crown, for receiving a seal, and a conduit opening into the end passing through the terminal.

7. The detachable module according to claim 1, said terminal being for making a connection of the optical type, and including at least one of:
- a conductor ending with at least one transmitter or a receiver at the surface of said end;
- an optical element, for example an optical fibre;
- an optical element, one end of which being flush with said contact end.

8. The detachable module according to claim 1, said terminal being for making a connection of the electrical type and including at least one of:
- a conductor ending with at least one conducting pad at the surface of said end, which forms a planar surface, or ending with at least one conducting pad of a surface set back from said end;
- 2 conducting pads, provided at different distances from the centre of the end, or from the centre of the surface set back from said end, or one of which is provided in the centre of the end or of the surface set back from said end.

9. A detachable module of a printer, said module comprising a case hosting at least one of an ink tank or a solvent tank, or a filter, or a tray or a support receiving or supporting a pump, or a part of an ink circuit in which at least one hose and/or at least one conductor has to be connected or an assembly for external draining or maintenance of said printer, said module further comprising at least one terminal for making a connection of the hydraulic or electrical or optical type in the printer, the terminal extending along an axis XX', and having an external surface including:
- a cylindrical portion, including a contact end and having a first diameter (d1), the contact end being provided with hydraulic or electrical or optical connection means,
- a collar, having a diameter (d2) greater than the first diameter (d1), including a first face and a second face, parallel to each other, wherein at least one of the first face and the second face forms a bearing surface,
- and along the axis XX' extending from a body of the contact end:
- a throat, having at least one planar part having a surface parallel to the axis XX', the bottom of said throat having a cross-section, in a plane perpendicular to the axis XX', having at least one arc of circle portion having a 3rd diameter (d3) strictly less than the diameter (d2) of the collar and at least one straight part, and a part of this cross-section having a width with a value lower than the 3rd diameter (d3),
- the throat continuing with a connector, for connecting to at least one hydraulic conduit or one electrical cable or one optical fibre of the printer.

10. The detachable module according to claim 9, said module comprising at least one of an ink tank or a solvent tank, or a filter, or a tray or a support receiving or supporting a pump, or a part of an ink circuit in which at least one hose and/or at least one conductor has to be connected or an assembly for external draining or maintenance of said printer.

11. An assembly of a detachable module according to claim 9 and a panel in said printer also provided with at least one terminal of the panel for making a connection of the hydraulic or electrical or optical type in said printer, said at least one terminal of the panel extending along an axis XX', and having an external surface including:
- a cylindrical portion, including a contact end and having a first diameter (d1), the contact end being provided with hydraulic or electrical or optical connection means,
- a collar, having a diameter (d2) greater than the first diameter (d1), including a first face and a second face, parallel to each other, wherein at least one of the first face and the second faces forms a bearing surface,
- and along the axis XX', extending from a body of the contact end:
- a throat, the bottom of which has a cross-section, in a plane perpendicular to the axis XX', having at least one arc of circle portion having a $3^{rd}$ diameter (d3) strictly less than the diameter of the collar, at least one straight part, and a part of this cross-section having a width with a value lower than the $3^{rd}$ diameter (d3),
- the throat continuing with a connector, for connecting to at least one hydraulic conduit or one electrical cable or one optical fibre of the printer.

12. An assembly according to claim 11, said panel being a face of a controller of said printer.

13. An assembly of a first detachable module according to claim 9 and a second detachable module according to claim 9.

* * * * *